United States Patent
Fuhrman et al.

(10) Patent No.: US 6,752,140 B1
(45) Date of Patent: Jun. 22, 2004

(54) APPARATUS AND METHOD FOR ADJUSTING THE CUTTING ANGLE OF A CUTTING TOOL

(75) Inventors: Michael D. Fuhrman, Bothell, WA (US); Dana E. Fuhrman, Bothell, WA (US)

(73) Assignee: Carver Saw Co., Bothell, WA (US)

( * ) Notice: Subject to any disclaimer, the term of this patent is extended or adjusted under 35 U.S.C. 154(b) by 141 days.

(21) Appl. No.: 09/960,893

(22) Filed: Sep. 21, 2001

(51) Int. Cl.[7] .................................................. B28D 1/04
(52) U.S. Cl. ............................. 125/13.03; 125/13.01; 451/358; 83/471.3
(58) Field of Search ......................... 125/13.01, 13.03; 451/358; 83/473, 471.3, 486.1, 490

(56) References Cited

U.S. PATENT DOCUMENTS

| | | | |
|---|---|---|---|
| 2,455,113 A | 11/1948 | Coates | |
| 2,486,386 A | 11/1949 | Bingaman | |
| 2,705,005 A | 3/1955 | Tuorto | |
| 2,863,441 A | 12/1958 | Harclerode | |
| 2,998,813 A | 9/1961 | Wilson | |
| 3,621,829 A * | 11/1971 | Maluck | 125/13.03 |
| 3,635,206 A | 1/1972 | Harclerode | |
| 3,807,095 A | 4/1974 | Harding et al. | |
| 3,815,570 A | 6/1974 | Story | |
| 4,428,159 A | 1/1984 | Sigetich et al. | |
| 4,940,038 A | 7/1990 | O'Keefe | |
| 4,991,354 A | 2/1991 | Schweickhardt | |
| 5,282,408 A | 2/1994 | Shiotani et al. | |
| 5,370,025 A * | 12/1994 | Itzov | 83/397 |
| 5,394,781 A | 3/1995 | Tsubai | |
| 5,482,026 A | 1/1996 | Russell | |
| 5,664,612 A | 9/1997 | Klemma | |
| 5,724,875 A * | 3/1998 | Meredith et al. | 83/397 |
| 5,746,193 A | 5/1998 | Swan | |
| 5,772,496 A | 6/1998 | Kurtz et al. | |
| 5,778,747 A * | 7/1998 | Chen | 83/471.3 |
| 5,819,624 A * | 10/1998 | Brault et al. | 83/471.3 |
| 5,882,155 A | 3/1999 | Testa, Jr. | |
| 6,000,387 A * | 12/1999 | Lee | 125/13.01 |
| 6,152,127 A | 11/2000 | Fuhrman et al. | |
| 6,272,961 B1 * | 8/2001 | Lee | 83/581 |
| 6,508,244 B2 * | 1/2003 | Lee | 125/12 |
| 6,561,068 B2 * | 5/2003 | Meredith et al. | 83/471.3 |

OTHER PUBLICATIONS

U.S. patent application Ser. No. 09/724,832, Fuhrman et al., filed Nov. 28, 2000.
MK Diamond Products, Inc., Tile and Stone Catalog, 1996, p. 13.
National Tile Contractors Association, Tile Letter, Mar., 1999, p. 61.

* cited by examiner

Primary Examiner—Joseph J. Hail, III
Assistant Examiner—Alvin J Grant
(74) Attorney, Agent, or Firm—Graybeal Jackson Haley LLP

(57) ABSTRACT

A cutting-tool mounting structure includes a cutting-tool base that supports a cutting-tool blade and permits one to pivot the blade about an axis parallel to the cutting direction of the blade and through a range of positions. The range of positions includes a first position where the blade is perpendicular or approximately perpendicular to the cutting surface, a second position where the blade is canted to one side of the first position, and a third position where the blade is canted to the other side of the first position. The tool base includes a motor mount that supports a cutting-tool motor and a blade mount that supports the blade and is rotatably attachable to the motor mount. By rotating the blade mount, the vertical cutting angle of the blade can be made substantially perpendicular to a cutting surface so that the blade can be positioned perfectly plumb for cutting.

21 Claims, 13 Drawing Sheets

US 6,752,140 B1

APPARATUS AND METHOD FOR ADJUSTING THE CUTTING ANGLE OF A CUTTING TOOL

TECHNICAL FIELD

This invention pertains generally to power tools and more particularly to an improved cutting tool such as a tile saw and methods for adjusting and operating the cutting tool.

BACKGROUND

Portable power saws such as tile saws are frequently used by craftspeople to cut building materials such as tiles and stone into different shapes and sizes for various applications. For example, craftspeople working on construction and remodeling projects often use tile saws to cut tiles and stone for floors, walls, countertops, and fireplaces. Because on-site tile cutting saves time and money as compared with off-site cutting, many tile saws are portable so that craftspeople can use them at the work site.

FIG. 1 is a perspective view of a portable tile saw 20, which includes a frame 22, tile-tray guide rails 24, a tile-cutting tray 26, a coolant pan 28, a cutting-tool mounting structure 30 including an arm 32, a saw motor 34, and saw blade 36. Because tiles are typically made from ceramic or stone, the saw blade 36 is often diamond tipped. The tile saw 20 is shown cutting a tile 38.

Unfortunately, a craftsperson (not shown) may have to repair or discard the tile saw 20 if damage to the structure 30, arm 32, or other component of the saw 20 causes the saw 36 to have an undesirable cutting angle. For example, improperly manufacturing or dropping the saw 20 may bend the structure 30, arm 32, or other component and this bend may move the blade 36 out of alignment. Typically, the craftsperson cannot realign the blade 36 without replacing the damaged component. Such component replacement is often expensive due not only to the cost of the part, but also to the "down time" during which the craftsperson cannot use the saw 20 while he awaits delivery of the replacement component. Moreover, in cases of severe damage, the saw 20 may be unrepairable and must be discarded and completely replaced.

SUMMARY OF THE INVENTION

In one aspect of the invention, a cutting-tool base includes a motor mount and a rotatable blade mount that is attachable to the motor mount.

Such a base typically allows one to realign a blade, such as a tile-saw blade, without costly repair or replacement of the tile saw.

DETAILED DESCRIPTION OF THE INVENTION

Figure 2:
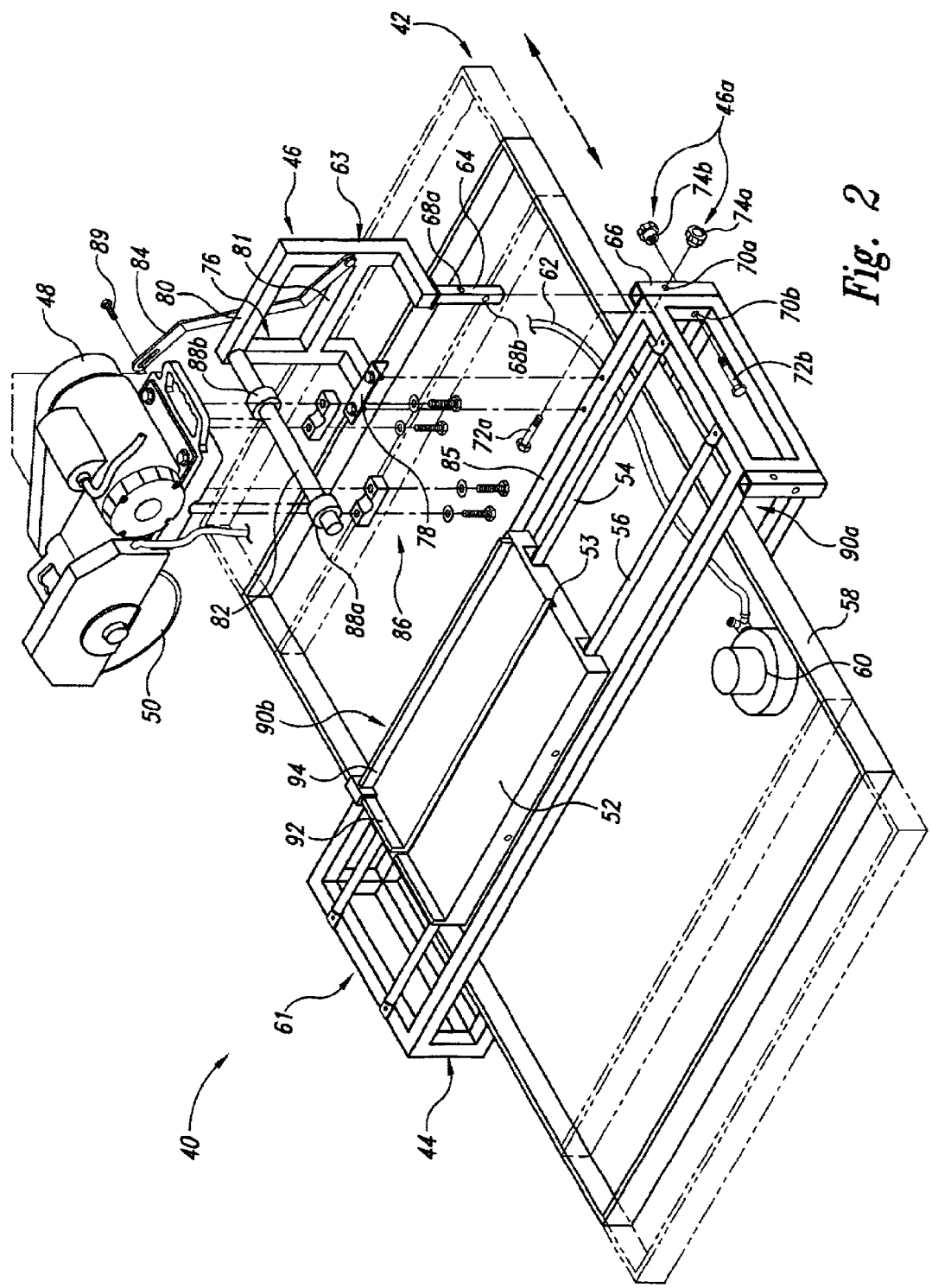
FIG. 2 is a perspective view of a tile saw having a removable cutting-tool mounting structure according to an embodiment of the invention.

FIG. 2 is a perspective view of a tile saw 40 having a saw-frame assembly 42, which includes a frame 44 and a removable cutting-tool mounting structure 46 according to an embodiment of the invention. The tile saw 40 also includes a saw motor 48 mounted to the structure 46, a saw blade 50, a cutting tray 52 having a cutting channel 53, cutting-tray guide rails 54 and 56, a coolant pan 58, a coolant pump 60, and a coolant hose 62.

The removable cutting-tool mounting structure 46 allows for easier carrying of the saw 40 as compared to prior saws. For example, a craftsperson (not shown) can remove the structure 46 and the attached motor 48 from the frame 44. Typically, the motor 48 has a handle 59, and the tubular construction of the frame 44 makes it easy for the craftsperson to grasp. Therefore, the craftsperson can put the cutting tray 52 inside the coolant tray 58, carry the motor 48 and attached support 46 in one hand, and carry an end 61 of the frame 44 in the other hand such that the coolant pan 58 and its contents do not fall away from the frame. Or, to reduce the weight being carried at any one time, the craftsperson can carry the motor 48 and the attached structure 46 to the destination, and then come back for the frame 44, the coolant pan 58, the cutting tray 52, and the other elements of the saw 40.

Still referring to FIG. 2, in one embodiment the cutting-tool mounting structure 46 includes a first support member 63 and an insert 64, which is attached to the support member 63 and which mates with a receptacle 66 of the frame 44. In one embodiment, the receptacle 66 is a hollow aluminum tube having a rectangular cross section. The insert 64 and receptacle 66 include aligned holes 68a and 68b and 70a and 70b, respectively, and fasteners such as bolts 72a and 72b are disposed within these holes to secure the structure 46 to the frame 44. The holes 68a, 68b, 70a, and 70b may be threaded, or fastening nuts such as thumb screws 74a and 74b may hold the bolts 72a and 72b in place. The thumb screws 74a and 74b promote quick hand attachment and removal of the structure 46 to and from the frame 44.

The structure 46 also includes a second support member 76, a mount 78 attached to the member 76, cross-support members 80 and 81, a saw-holding bar 82, and a saw-stabilization bracket 84 according to an embodiment of the invention. To promote quick hand attachment and removal of the structure 46 to and from the frame 44, the mount 78 may be attachable to a cross element 85 of the frame 44 with bolts and thumb screws (not shown) that are similar to the bolts 72a and 72b and thumb screws 74a and 74b. The bar 82 is a cylindrically shaped solid-steel rod, and the saw motor 48 is attached thereto with a conventional bracket-and-bolt mounting assembly 86, which allows the craftsperson to adjust the height of the saw blade 50 by rotating the motor 48 about the bar 82. Donut washers 88a and 88b prevent side-to-side movement of the motor 48 so that the saw blade 50 stays aligned with a cutting channel 53. The washers 88a and 88b may be welded to the bar 82 or may be secured to the bar with set screws (not shown). The set screws are useful where the cutting tray 52 has multiple cutting channels 53 (only one shown in FIG. 2) because it allows the craftsperson to align the saw blade 50 with the desired channel. Furthermore, unlike prior tile saws, the craftsperson can adjust the position of the saw motor 48 along the bar 82 while the cutting-tool mounting structure 46 is unattached to the frame 44. In such an embodiment, the bar 82 may have an alignment mark (not shown) that the craftsman can use to align the blade 50 to the cutting channel 53 while the support 46 is not attached to the frame 44. The bracket 84 provides added support to the motor 48. One end of the bracket 84 attaches to the support member 63, and the other end attaches to the motor 48 with a fastener 89 and is slotted to allow the motor 48 to be rotated about the bar 82.

In one embodiment, the components of the cutting-tool mounting structure 46 have the following dimensions (outside dimensions are given where applicable). The support members 63 and 76 are L shaped, have horizontal sections that are approximately 5" long, vertical sections that are approximately 6.75" high, and have 1.5"×1.5" cross sections. The insert 64 is approximately 6.75" high and has a 1.125"×1.125" cross section. The mount 78 is made from 0.25"-thick steel and is approximately 6.25" long, 1.75" wide, and 1.75" deep. The cross-support members 80 and 81 are approximately 8.75" long, and member 80 has a 1.5"× 1.5" cross section. The bar 82 is approximately 16.5" long and has a diameter of approximately 0.25" diameter.

Figure 1:
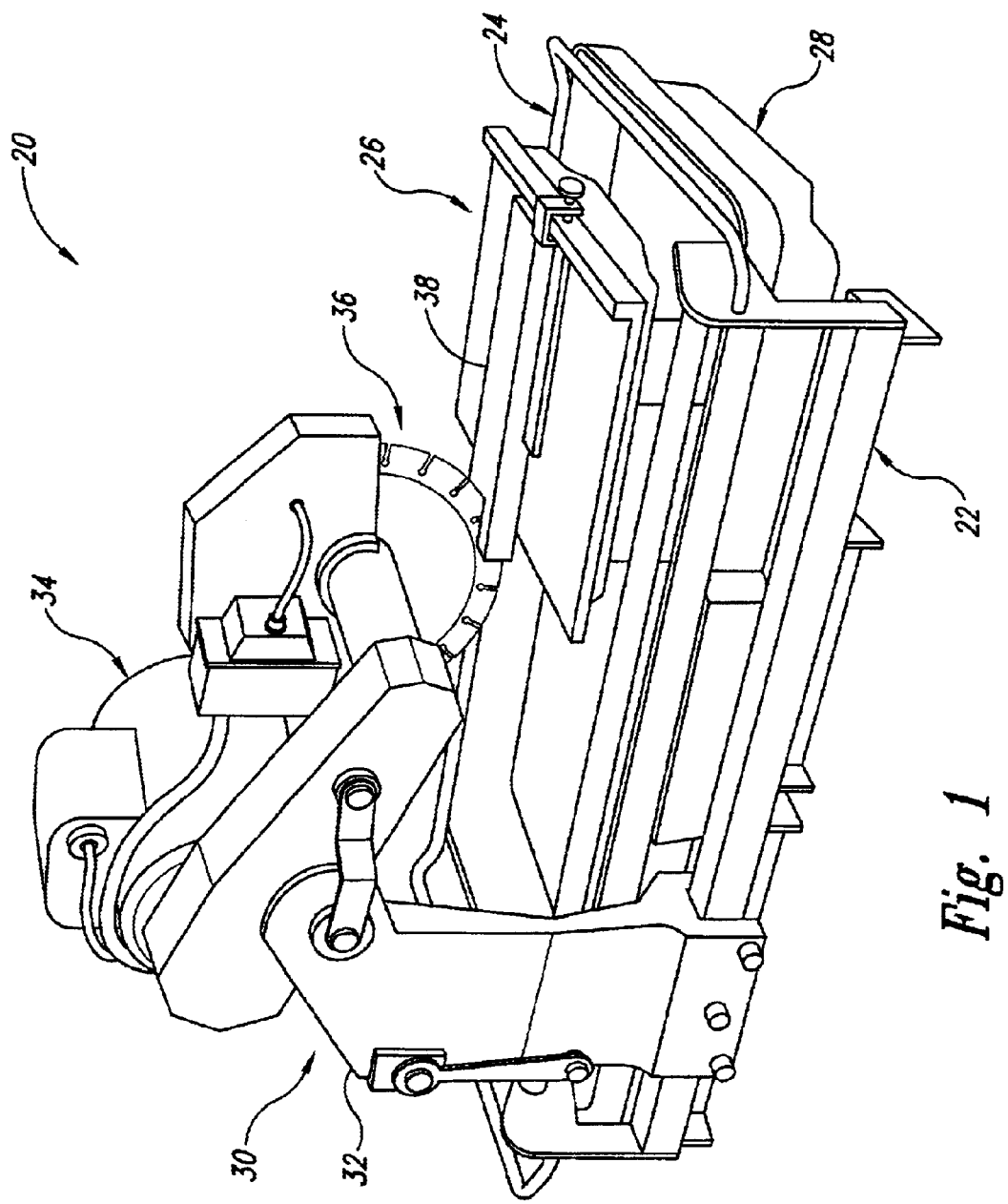
FIG. 1 is a perspective view of a tile saw according to the prior art.

Still referring to FIG. 2, the coolant pan 58 is better able to catch dripping coolant than conventional coolant pans. The pan 58 holds a coolant such as water, which the pump 60 pumps through the hose 62 to cool the saw blade 50, and recovers the coolant that drips from the tile (FIG. 1) being cut. In one embodiment, the coolant pan 58 is disposed and can slide within a slot formed by side openings 90a and 90b of the frame 44. Thus, the craftsman can adjust the position of the pan 58 so that it can catch coolant dripping from both wide and narrow tiles. The pan 58 is also wider than conventional coolant pans, and this further increases the pan's positional range.

Still referring to FIG. 2, additional features of the tile saw 40 are discussed. In one embodiment, the frame 44 is rectangular and is formed from welded aluminum tubes having rectangular or square cross sections. A large version of the frame 44 is approximately 39" long by 20" wide by 6¾" high. When including this large frame, the tile saw 40 allows a craftsman to cut tiles having widths up to approximately 24". However, the tile saw 40 can include frames 44 of different sizes. In another embodiment, the coolant pan 58 is 40" wide, and thus is wider than the length of the frame 44. Therefore, the frame 44 fits inside the coolant pan 58 along with the other parts of the saw 40—e.g., the mounting support 46, motor 48, and blade 50—for convenient storage. In still another embodiment, conventional positioning rails 92 and 94 are attached to the cutting tray 52 to hold a tile in place while being cut. In yet another embodiment, the cutting tray 52 has multiple cutting channels 53.

Still referring to FIG. 2, in operation, the craftsperson attaches the saw blade 50 and the motor 48 to the cutting-tool mounting structure 46, and attaches the structure 46 to the frame 44. He/she then measures a tile (FIG. 1) and marks where the cut is to be made. Next, the craftsperson places the tile on the cutting tray 52 and adjusts the positioning guides 92 and 94 so that the cut mark is aligned with the saw blade 50. He/she then positions the cooling pan 58 so that it is under both side edges of the tile. This insures that the pan 58 will catch coolant dripping from either side of the tile. Next, the craftsperson starts the motor 48, pushes the tray 52, and thus the tile, toward and into the blade 50, and continues pushing until the tile is cut. He/she then turns off the motor 48.

Figure 3:
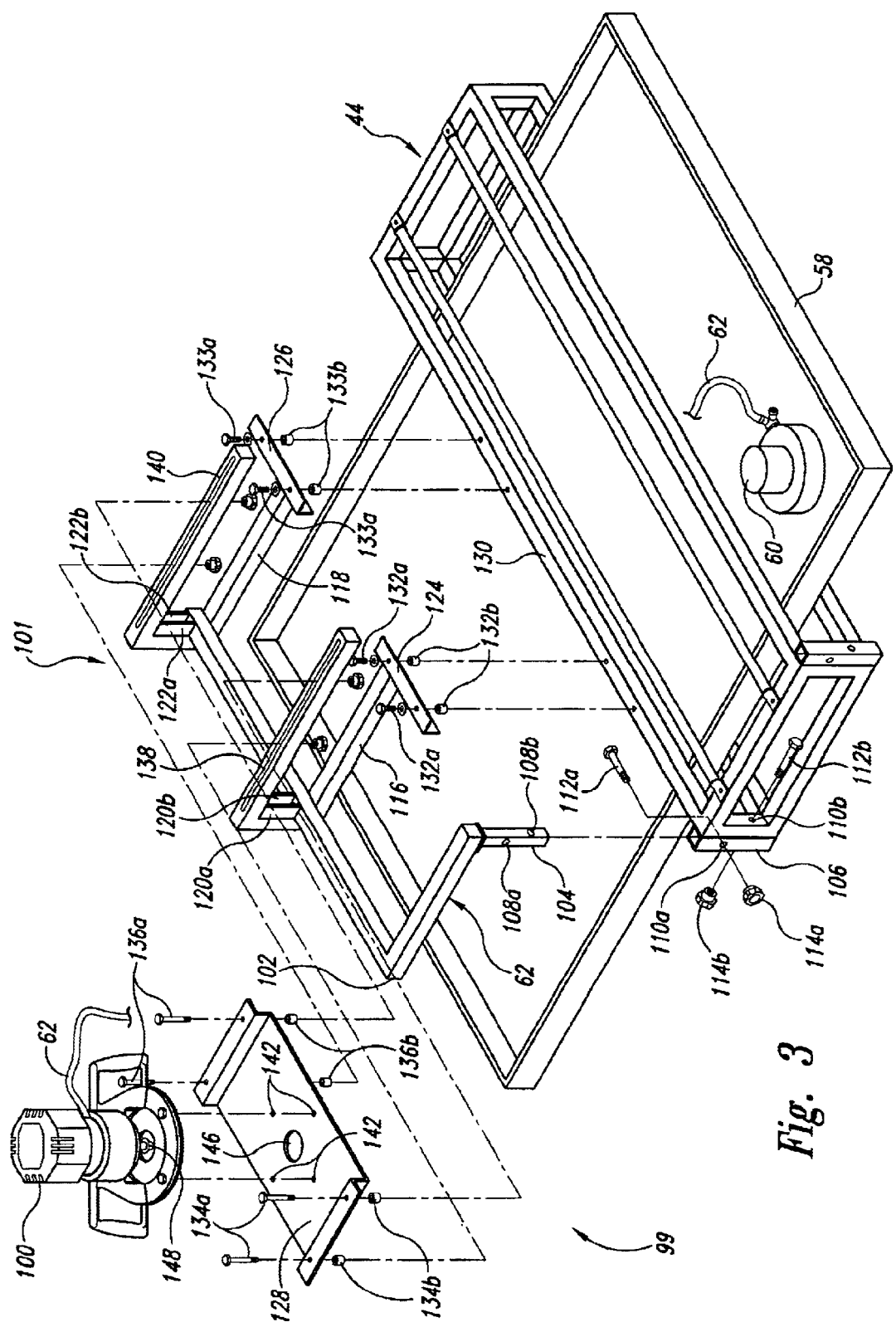
FIG. 3 is a perspective view of the tile-saw frame and coolant pan of FIG. 2 and a removable routing assembly according to an embodiment of the invention.

FIG. 3 is a perspective view of the frame 44 and the coolant pan 58 of the tile saw 40 of FIG. 2, and a removable router assembly 99 according to an embodiment of the invention. The assembly 99 includes a conventional router 100 and a router mounting structure 101, which allows a craftsperson to route the edge of a cut tile using the tile saw 40. Furthermore, because the saw-motor mounting and router mounting structures 46 (FIG. 2) and 101 are relatively easy to attach to and remove from the frame 44, the craftsperson can easily switch back and forth between tile cutting and tile routing. This saves the craftsman time and money as compared with using a separate routing tool or sending the tile out to be routed.

In one embodiment, the router mounting structure 101 includes a cross-support member 102 and an insert 104, which is attached to the member 102 and which mates with a receptacle 106 of the frame 44. The insert 104 and receptacle 106 may be similar to the insert 64 and receptacle 66 of FIG. 2, and include aligned holes 108a and 108b and 110a and 110b, respectively. Fasteners such as bolts 112a and 112b are disposed within these holes to secure the structure 101 to the frame 44. The holes 108a, 108b, 110a, and 110b may be threaded, or fastening nuts such as thumb screws 114a and 114b may hold the bolts 112a and 112b in place. The thumb screws 114a and 114b promote quick hand attachment and removal of the structure 101 to and from the frame 44.

In one embodiment, the router mounting structure 101 also includes first and second support members 116 and 118, corner support brackets 120a and 120b and 122a and 122b, mounts 124 and 126, and a router mounting plate 128. To promote quick hand attachment and removal of the structure 101 to and from the frame 44, the mounts 122 and 124 are attachable to a cross element 130 of the frame 44 with bolts and thumb screws 132a and 132b and 133a and 133b. In addition, the plate 128 is attachable to the support members 116 and 118 with bolts and thumb screws 134a and 134b and 136a and 136b. Furthermore, to allow lateral movement and positioning of the plate 128, the members 116 and 118 include respective bolt slots 138 and 140. The plate 128 includes router mounting holes 142, which receive bolts (not shown) for mounting the router 100 to the plate 128. These bolts may be secured with thumb screws (not shown) to promote quick hand attachment and removal of the router 100 from the plate 128. The plate 128 also includes a bit opening 146 through which a router bit 148 extends. The router 100 or the structure 101 may include a mechanism (not shown) that allows the craftsperson to adjust the distance that the bit 148 extends through the opening 146.

In one embodiment, the components of the router mounting structure 101 have the following dimensions (outside dimensions are given where applicable). The cross-support member 102 is approximately 11.5" wide by 26.25" long. The insert 104 is approximately 6.75" high and has a cross section of approximately 1.125"×1.125". The support members 116 and 118 are approximately 6.75" high, 12.75" wide along the bottom portions, and 15.625" wide along the slotted top portions. The slots 138 and 140 are approximately 11.625" long by 0.625" wide. The support member 116 is approximately 9.75" from the insert 104, and the support member 118 is approximately 12" from the member 116. The mounts 124 and 126 are made from 0.25"-thick steel and are approximately 6.25" long, 1.75" wide, and 1.75" deep. The supports 120a, 120b, 122a, 122b are each made from 0.125"-thick steel and are approximately 2.25" high by 1.5" wide. The plate 128 is formed from 0.25"-thick steel, is approximately 14.94" long by 8" wide, has vertical flange sections that are approximately 1.75" high, and has horizontal flange sections that are approximately 1.75" wide.

Still referring to FIG. 3, in operation, the craftsperson attaches the router 100 to the plate 128, attaches the plate 128 to the router mounting structure 101, and attaches the structure 101 to the frame 44. He/she then adjusts the router bit 148 to the desired depth. Next, the craftsperson places a tile (FIG. 1) on the cutting tray 52 (FIG. 2) and adjusts the positioning guides 92 and 94 (FIG. 2) so that the edge of the tile to be routed is in the desired position with respect to the router bit 148. He/she then positions the cooling pan 58 so that it is under both side edges of the tile. This insures that the pan 58 will catch coolant dripping from either side of the tile. Next, the craftsperson starts the router 100, pushes the tray 52, and thus the tile, and continues pushing until the tile edge is shaped by the bit 148. He/she then turns off the router 100.

In operation, when the craftsperson wishes to cut a tile and then route an edge of the tile, he first attaches the cutting-tool mounting structure 46 to the frame 44 as described above in conjunction with FIG. 2. He/she then cuts the tile as described above. Next, the craftsperson attaches the router mounting structure 101 to the frame 44. If he/she would like more room to work, then he/she can remove the cutting-tool mounting structure 46 before routing the tile. Then, the craftsperson routes an edge of the tile as described above.

Figure 4:
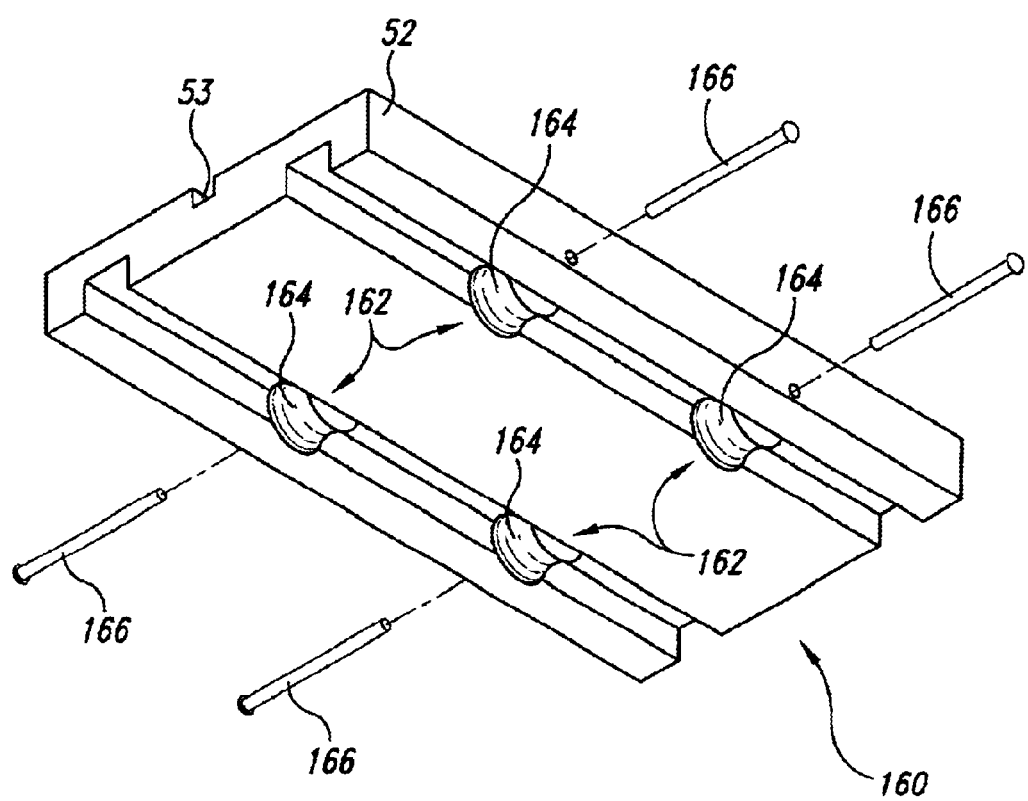
FIG. 4 is a perspective view of the underside of the tile tray of FIG. 2 and the tile-tray wheel assembly according to an embodiment of the invention.

FIG. 4 is a perspective view of the underside of the cutting tray 52 of FIG. 2 and a tray wheel assembly 160 according to an embodiment of the invention. The assembly 160 includes four wheels 162, which have respective U grooves 164 and respective center bearings (not shown). Axles 166 extend through the respective bearings and secure the wheels 162 to the tray 52. The grooves 164 have semi-circular cross sections with approximately the same radii as the respective tray guide rails 54 and 56 (FIG. 2). The shape of the grooves 164 and the relatively close fit between the grooves 164 and the guide rails 54 and 56 ensure that the wheels 162 will roll smoothly even if small particles of dust or other debris adhere to the guide rails. Consequently, there will be few, if any, jitter-induced nicks in the tile being cut or routed. The shapes of the grooves 164 allows the wheels 162 to provide a lateral counterforce and lateral stability sufficient to oppose the lateral force imparted to the tile by the router bit 148 during the routing of the tile.

Figure 5:
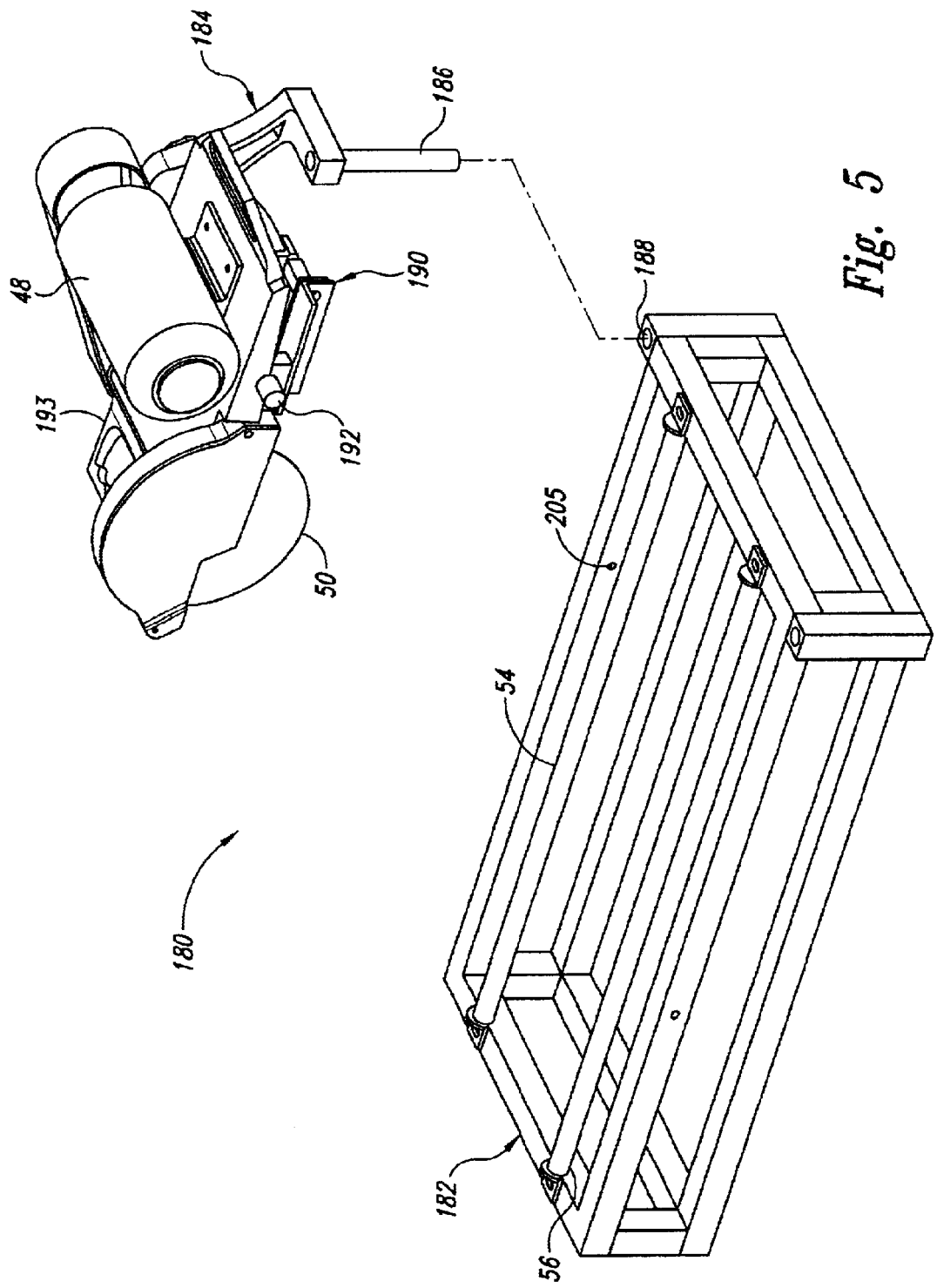
FIG. 5 is a perspective view of a tile saw having a removable and swivelable cutting-tool mounting structure according to an embodiment of the invention.

FIG. 5 is a perspective view of a tile saw 180 having a frame 182 and a removable and swivelable cutting-tool mounting structure 184 according to an embodiment of the invention, where like numerals are used to refer to like elements with respect to the tile saw 40 of FIG. 2. For clarity, the cutting tray 52, the coolant pan 58, and other elements are omitted from FIG. 5.

In addition to allowing for easier carrying of the tile saw 40, the cutting-tool mounting structure 184 allows one to swivel the saw 40 with respect to the frame 182, allows one to lock the structure in a range of swivel positions, and allows one to more easily rotate the saw 40 in an up or down direction.

More specifically, the cutting-tool mounting structure 184 includes a cylindrical insert 186, and the frame 182 includes a hollow cylindrical receptacle 188 for receiving the insert 186. Because the insert 186 and receptacle 188 are cylindrical, the insert 186 can rotate within the receptacle 188. Consequently, the cutting-tool mounting structure 184—and thus the saw motor 48 and blade 50—can swivel with respect to the frame 182. This allows one to swivel the motor 48 to the side of the frame 182, and thus out of the way, without removing the motor 48 and the cutting-tool mounting structure 184 from the frame 182.

The cutting-tool mounting structure 184 also includes an adjustable bracket 190, which allows one to lock the structure 184—and thus the motor 48 and blade 50—in a range of swivel positions. This allows one a greater ability to align the blade 50 with the tray cutting channel 53 (FIG. 2). For example, if one drops the motor 48, frame 182, or cutting-tool mounting structure 184, and this dropping knocks the blade 50 out of alignment, one can often realign the blade 50 by readjusting the bracket 190. With an unadjustable bracket, such a misalignment may be correctable only with an expensive repair, or may be uncorrectable and thus render the saw 40 unusable. The bracket 190 is further discussed below in conjunction with FIGS. 7–8.

Figure 6:
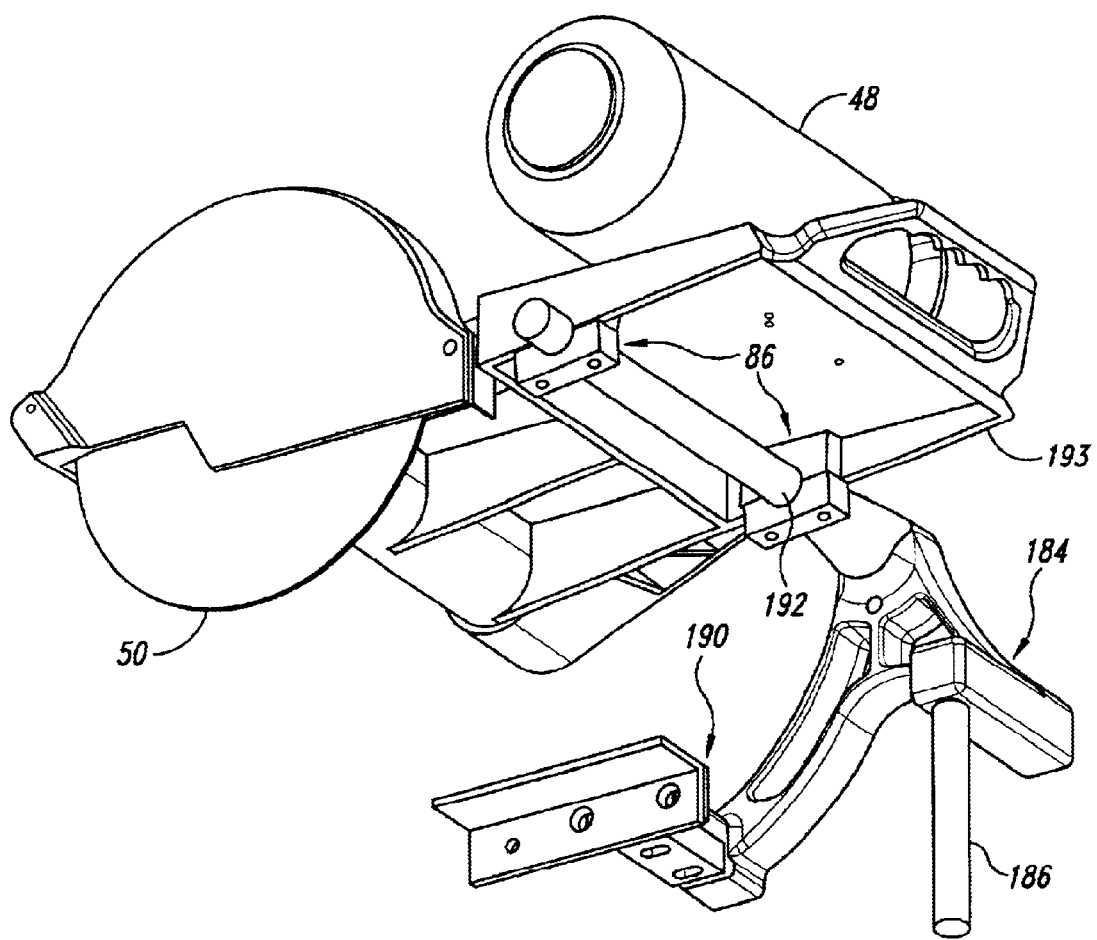
FIG. 6 is a perspective view of the saw and cutting-tool mounting structure of FIG. 5 according to an embodiment of the invention.

The cutting-tool mounting structure 184 further includes a rotatable holding bar 192, which allows one to adjust the height of the saw blade 50 without loosening the bracket-and-bolt mounting assembly 86 (FIGS. 2 and 6). A cutting-tool base 193, to which the saw blade 50 and saw motor 48 are mounted, is attached to the holding bar 192.

FIG. 6 is a perspective view of the underside of the saw blade 50, saw motor 48 and the cutting-tool mounting structure 184 of FIG. 5 according to an embodiment of the invention.

Figure 7:
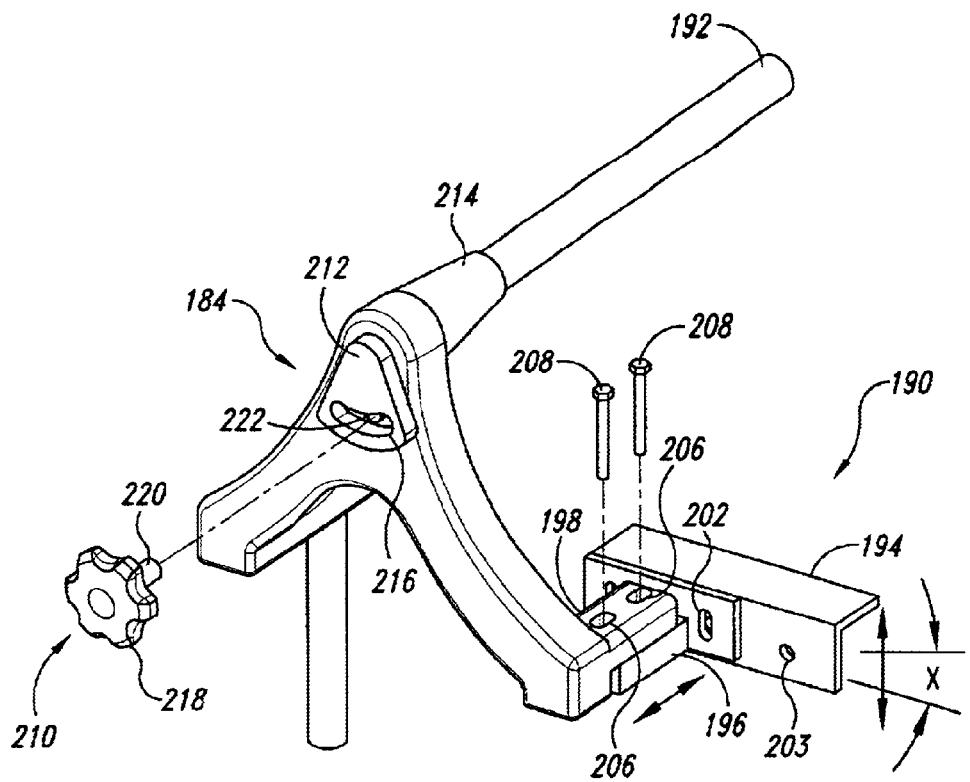
FIG. 7 is a partially exploded view of the cutting-tool mounting structure of FIGS. 5 and 6 according to an embodiment of the invention.
Figure 8:
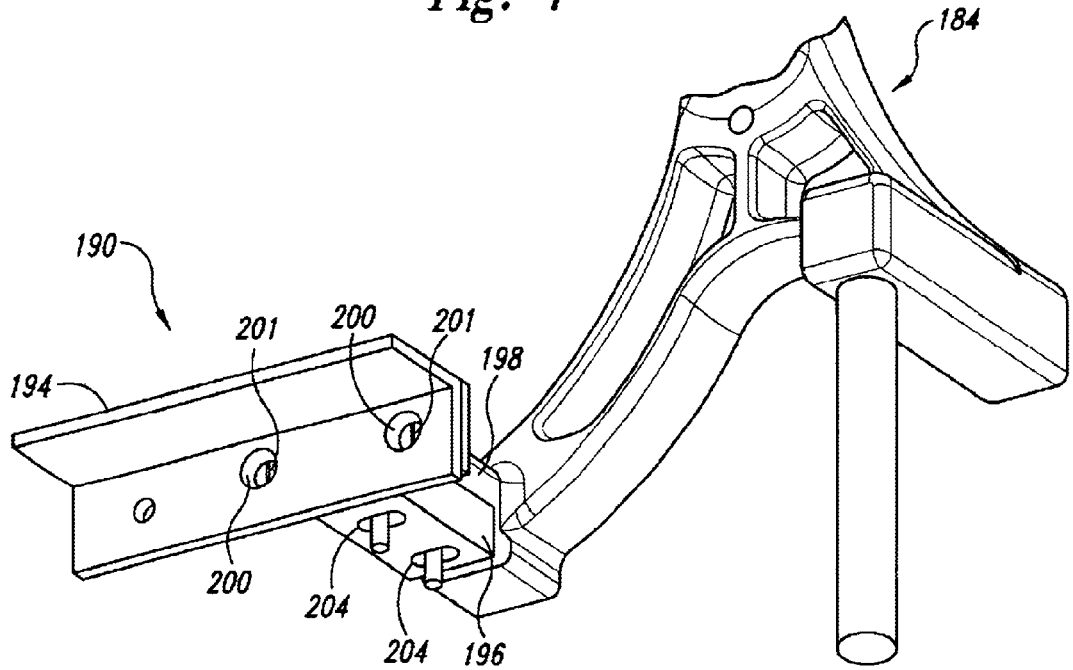
FIG. 8 is a perspective view of the cutting-tool mounting structure of FIGS. 5–7 according to an embodiment of the invention.

FIGS. 7–8 are partially exploded views of the cutting-tool mounting structure 184 of FIGS. 5–6 according to an embodiment of the invention.

Referring to FIGS. 7–8, the bracket 190 includes an L-shaped member 194 for engaging the frame 182 (FIG. 5), a support member 196 to which the member 194 is attached, and an extension arm 198 to which the support member 196 is attached.

The member 194 includes one or more countersunk holes 200 for receiving respective fasteners 201, such as bolts or screws, that attach the member 194 to the support member 196, and includes one or more holes 203 for receiving fasteners (not shown) that attach the bracket 190 to the frame 182 via one or more frame holes 205 (FIG. 5). The holes 203 or 205 may be vertically or horizontally elongated to accommodate different adjustments of the bracket 190.

The member 196 includes elongated holes 202 for respectively receiving the fasteners 201. Because the holes 202 are elongated, they allow one to adjust the height of the member 194 with respect to the member 196. The member 196 also includes holes 204, which are elongated in a direction parallel to the L-shaped member 194, and the arm 198 includes holes 206, which are elongated in a direction perpendicular to the L-shaped member 194. Fasteners 208 fasten the member 196 to the arm 198. Because the holes 204 and 206 are elongated in perpendicular directions, one can adjust the angle x of the member 196, and thus of the L-shaped member 194, with respect to the arm 198. Thus, one can lock the swivel position of the cutting-tool mounting structure 184, and thus the angle of the saw blade 50 (FIGS. 5–6), with the member 194 evenly abutting, i.e., being flush with, the cross member of the frame 182 (FIGS. 5–6).

Referring to FIG. 7, the cutting-tool mounting structure 184 also includes a saw position assembly 210, which allows one to adjust the height of the saw blade 50 (FIGS. 5–6) according to an embodiment of the invention. The assembly 210 includes a plate 212 that is attached to the end of the holding bar 192, which is free to rotate within a receptacle 214. The receptacle 214 may or may not include a bearing. The plate has a slot 216, which is concentric with the bar 192. The assembly 210 also includes a thumb knob 218 having a threaded shaft 220, which engages a threaded hole 222 in the mounting structure 184. One can adjust the height of the blade 50 by loosening the knob 218, rotating the bar 192 until the blade 50 is at the desired height, and tightening the knob 218 to lock the blade 50 at the desired height.

Figure 9:
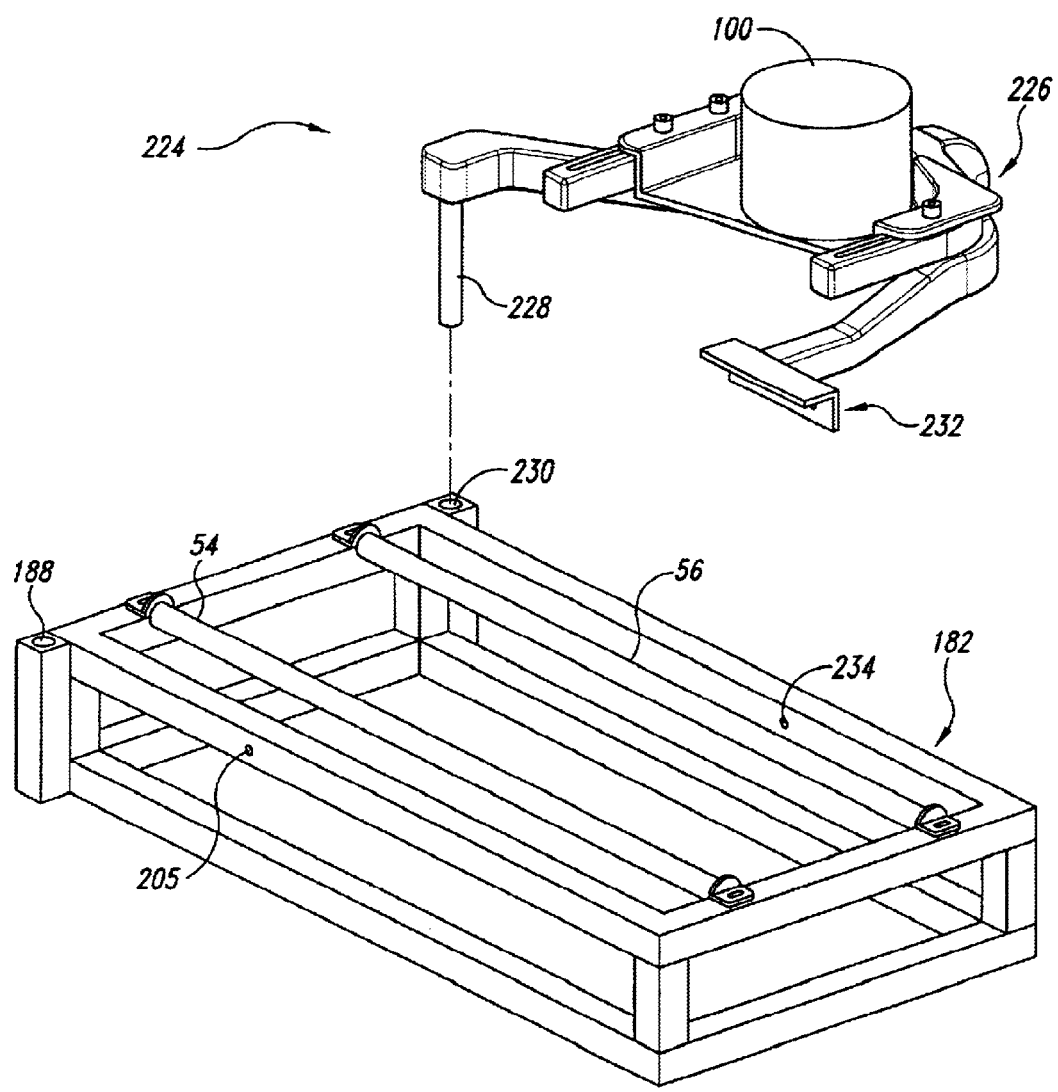
FIG. 9 is a perspective view of the tile-saw frame of FIG. 5 and a removable and swivelable router assembly according to an embodiment of the invention.

FIG. 9 is a perspective view of the frame 182 of FIG. 5 and a removable and swivelable router assembly 224 according to an embodiment of the invention, where like numerals are used to refer to like elements with respect to the router assembly 99 of FIG. 3. For clarity, the cutting tray 52, the coolant pan 58, the router bit 148, and other elements are omitted from FIG. 9.

The router assembly 224 includes the router 100 and a router mounting structure 226, which allows one to swivel the router 100 with respect to the frame 182. More specifically, the router mounting structure 226 includes a cylindrical insert 228, and the frame 182 includes a hollow cylindrical receptacle 230 for receiving the insert 228. Because the insert 228 and the receptacle 230 are cylindrical, the insert 228 can rotate within the receptacle 230. Consequently, the router mounting structure 226—and thus the router 100—can swivel with respect to the frame 182. This allows one to swivel the motor router 100 to the side of the frame 182, and thus out of the way, without removing the router 100 and the router mounting structure 226 from the frame 182. An adjustable bracket 232 allows one to lock the router mounting structure to the frame 182 with a fastener (not shown) via one or more frame holes 234. The bracket 232 is further discussed below in conjunction with FIG. 10.

Figure 10:
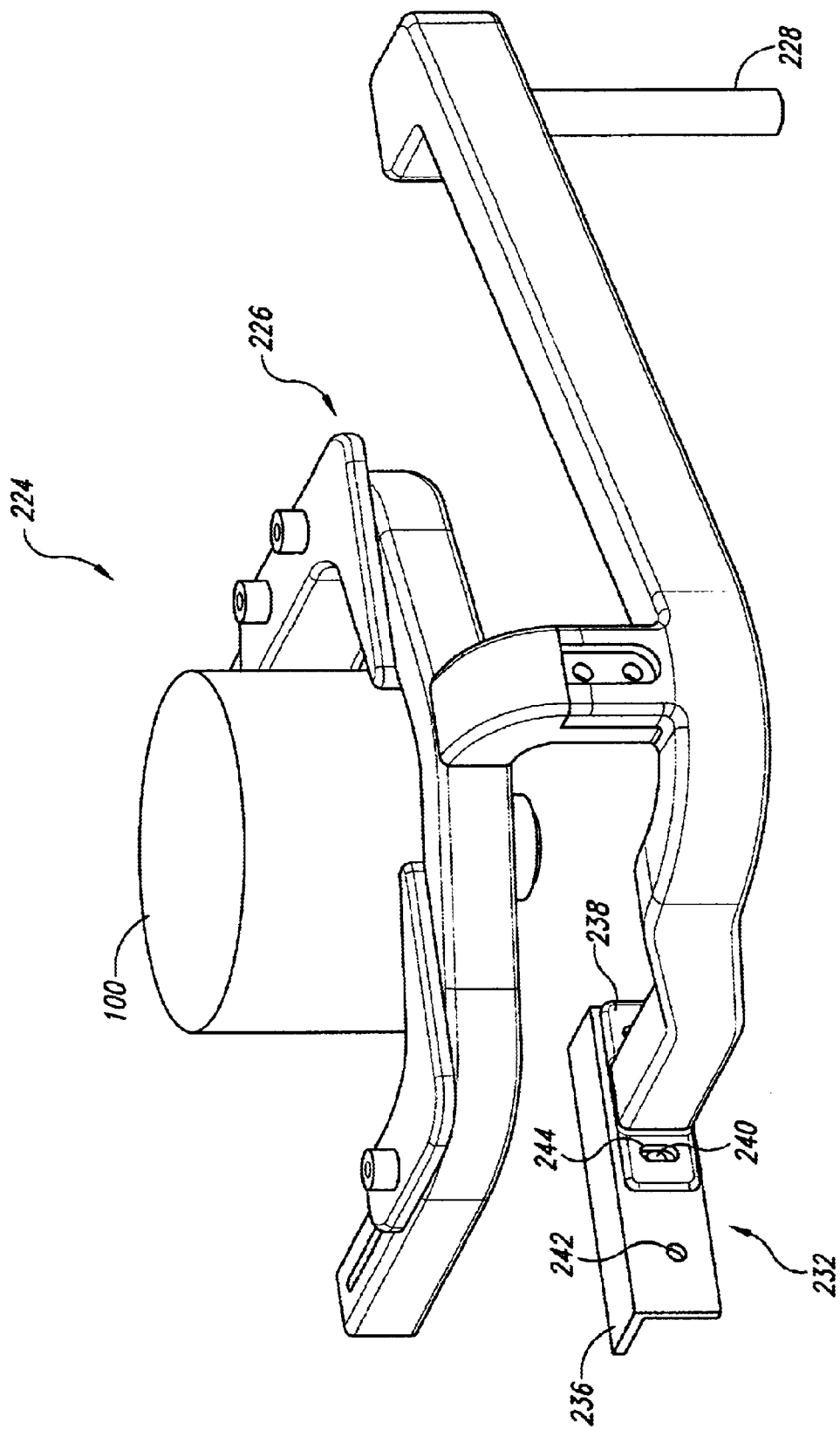
FIG. 10 is a perspective view of the router assembly of FIG. 9 according to an embodiment of the invention.

FIG. 10 is a perspective view of the rear side the router assembly 224 of FIG. 9 according to an embodiment of the invention. The bracket 232 includes an L-shaped member 236 for engaging the frame 182 (FIG. 9) and includes a support member 238 to which the member 236 is attached. The member 236 includes one or more countersunk holes 240 for receiving respective fasteners (not shown) that attach the member 236 to the support member 238, and includes one or more holes 242 for receiving fasteners (not shown) that attach the bracket 232 to the frame 182 via the one or more frame holes 234 (FIG. 9). The holes 234 or 242 may be vertically or horizontally elongated to accommodate different adjustments of the bracket 232.

The support member 238 includes elongated holes 244 for respectively receiving the fasteners that extend through the holes 240 of the member 236. Because the holes 244 are elongated, they allow one to adjust the height of the member 236 with respect to the member 238, and thus to square up the router assembly 224 with the frame 182.

Referring to FIGS. 9–10, in another embodiment the bracket 232 is similar to the bracket 190 of FIGS. 5–8.

Figure 11:
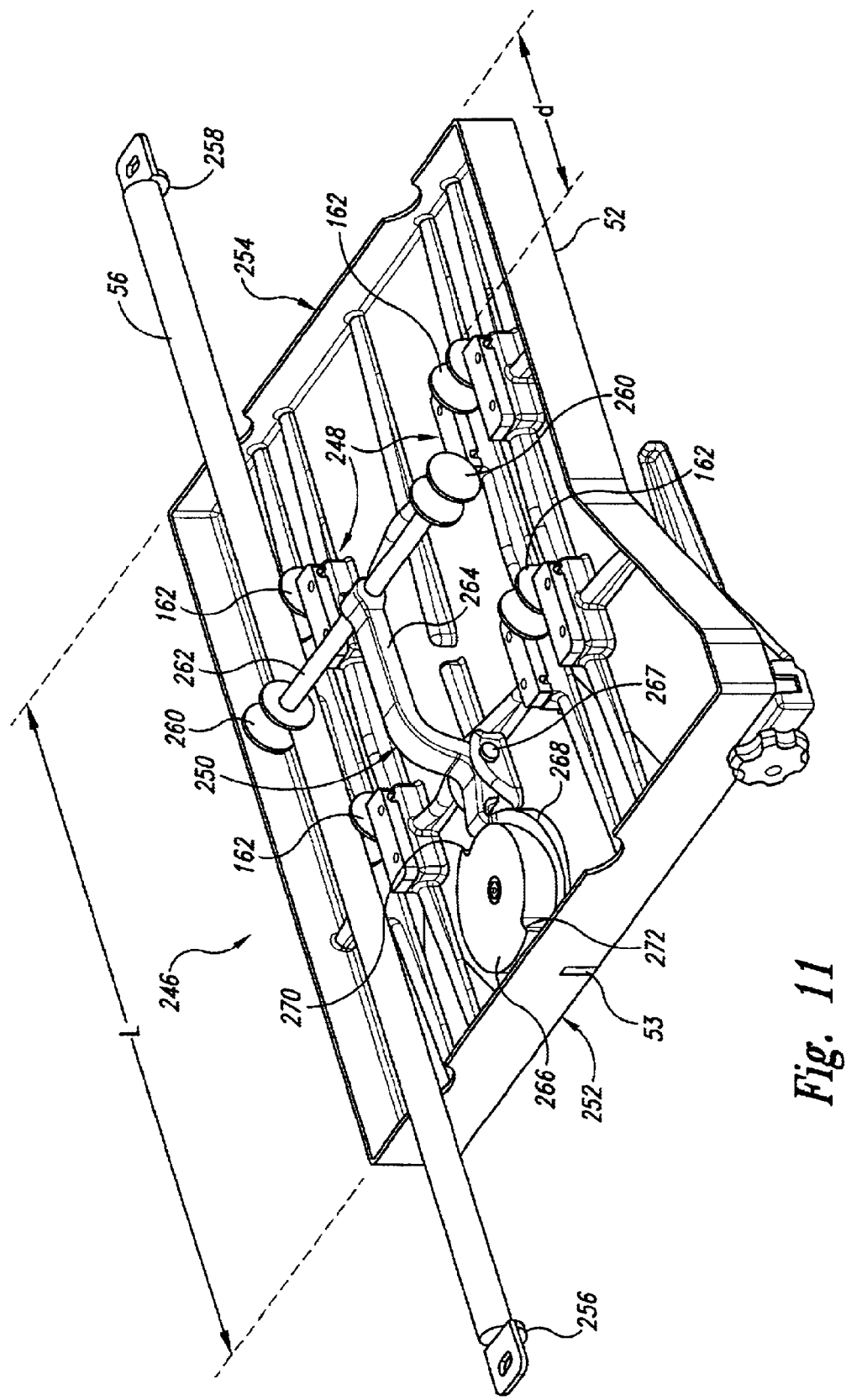
FIG. 11 is a perspective view of the underside of the tile tray of FIG. 2 and tile-tray wheel and retain-release assemblies according to an embodiment of the invention.

FIG. 11 is a perspective view of an undercarriage 246 of the tile tray 52 according to an embodiment of the invention, where like numerals refer to like elements with respect to FIGS. 2 and 4. The undercarriage 246 includes a wheel assembly 248 and a retaining mechanism 250 for locking the tray 52 to the guide rails 54 and 56 (only guide rail 56 shown in FIG. 11 for clarity).

The wheel assembly 248 includes the U-grooved wheels 162, which are discussed above in conjunction with FIG. 4. The wheels 162 are mounted inward of ends 252 and 254 of the tray 52. In one embodiment where the tray has a length L, each wheel 162 is mounted approximately $\frac{1}{8}L$–$\frac{1}{3}L$ from the end 252 or 254 closest to the wheel. Because end rail end tabs 256 and 258 prevent the wheels 162 from traveling past the ends of the rails 54 and 56, mounting the wheels inward of the ends 252 and 254 increases the travel-distance range of the tray 52 as compared to a tray with wheels mounted at the tray ends. For example, if all the wheels 162 are mounted the same distance d from the closest tray edge (d is measured from the portion of the wheel 162 closest to the tray edge), then the travel-distance range is increased by approximately d in each travel direction for a total increase of 2d as compared to a tray with end-mounted wheels. That is, if the wheels 162 are mounted at the tray ends 252 and 254, then the tray ends cannot travel beyond the tabs 256 and 258, respectively. But with the wheels 162 mounted a distance d from the tray ends 252 and 254, the tray ends 252 and 254 can each travel a distance d beyond the tabs 256 and 258, respectively. Consequently, mounting the wheels 162 inward of the tray ends 252 and 254 provides an increase in the tray travel distance without requiring an increase in the length of the frame 182 (FIGS. 5 and 9).

The retaining mechanism 250 includes retaining wheels 260, an axle 262, a member 264, and a retain-release knob 266. The wheels 260, which are mounted to the axle 262, are similar to the wheels 162 and respectively engage the bottoms of the rails 54 and 56 when the mechanism 250 is in a retain position. Although two wheels 260 are shown, the mechanism 250 may have fewer or more than two wheels 260. The member 264, which pivots at a pivot point 267, supports the axle 262 and forces the wheels 260 to engage the rails 54 and 56 when the knob 266 is in a retain position. The knob 266 has a sloped edge 268 and stops 270 and 272. As the knob rotates clockwise, the portion of the edge 268 that engages the member 264 becomes thicker. This forces the wheels 162 and 260 against opposite sides of the rails 54 and 56, and thus locks the tray 52 to the rails 54 and 56. Such locking of the tray prevents a material that overhangs the edges 252 or 254 from tipping the tray, and also prevents the tray from accidentally falling off the rails 54 and 56. As the knob rotates counterclockwise, the portion of the edge 268 that engages the member 264 becomes thinner, thus unlocking the tray 52 from the rails 54 and 56.

Still referring to FIG. 11, the procedure for installing the tray 52 on and removing the tray 52 from the rails 54 and 56 is discussed according to an embodiment of the invention. One first turns the knob 266 counterclockwise to release the retaining wheels 260. As one turns the tray 52 so that the underside faces downward (if the underside does not already face downward), the released wheels 260 fall away from the wheels 162, thus increasing the spread between the wheels 162 and 260. One tilts the tray 52 as necessary to place the wheels 260 beneath rails 54 and 56, and then installs the tray 52 onto the frame 182 (FIGS. 5, 6, and 8) such that the wheels 162 respectively engage the upper surfaces of the rails 54 and 56. Next, one turns the knob 266 clockwise to respectively engage the retaining wheels 260 with the bottom surfaces of the rails 54 and 56, thus locking the tray 52 to the rails 54 and 56. To remove the tray 52 from the rails 54 and 56, one turns the knob 266 counterclockwise to release the retaining wheels 260, and then tilts the tray 52 as necessary to remove wheels from under the rails 54 and 56.

Figure 12:
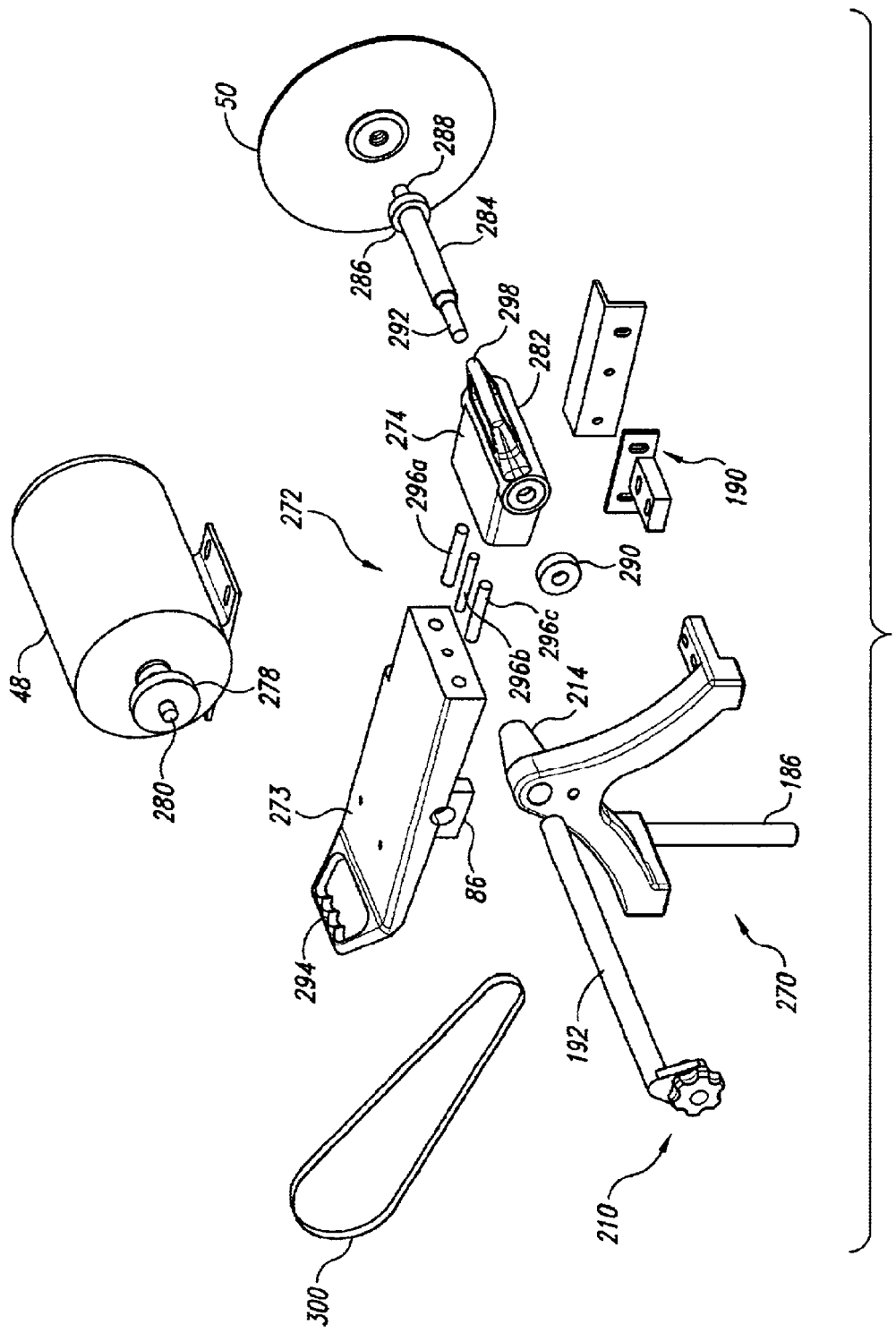
FIG. 12 is an exploded view of a saw motor, saw blade and a cutting-tool mounting structure according to an embodiment of the invention.

FIG. 12 is an exploded view of a cutting-tool mounting structure 270, which includes a cutting-tool base 272 according to an embodiment of the invention. Like numerals in FIG. 12 indicate like elements with respect to the cutting-tool mounting structure 184 and cutting-tool base 191 of FIGS. 5–8.

Figure 13:
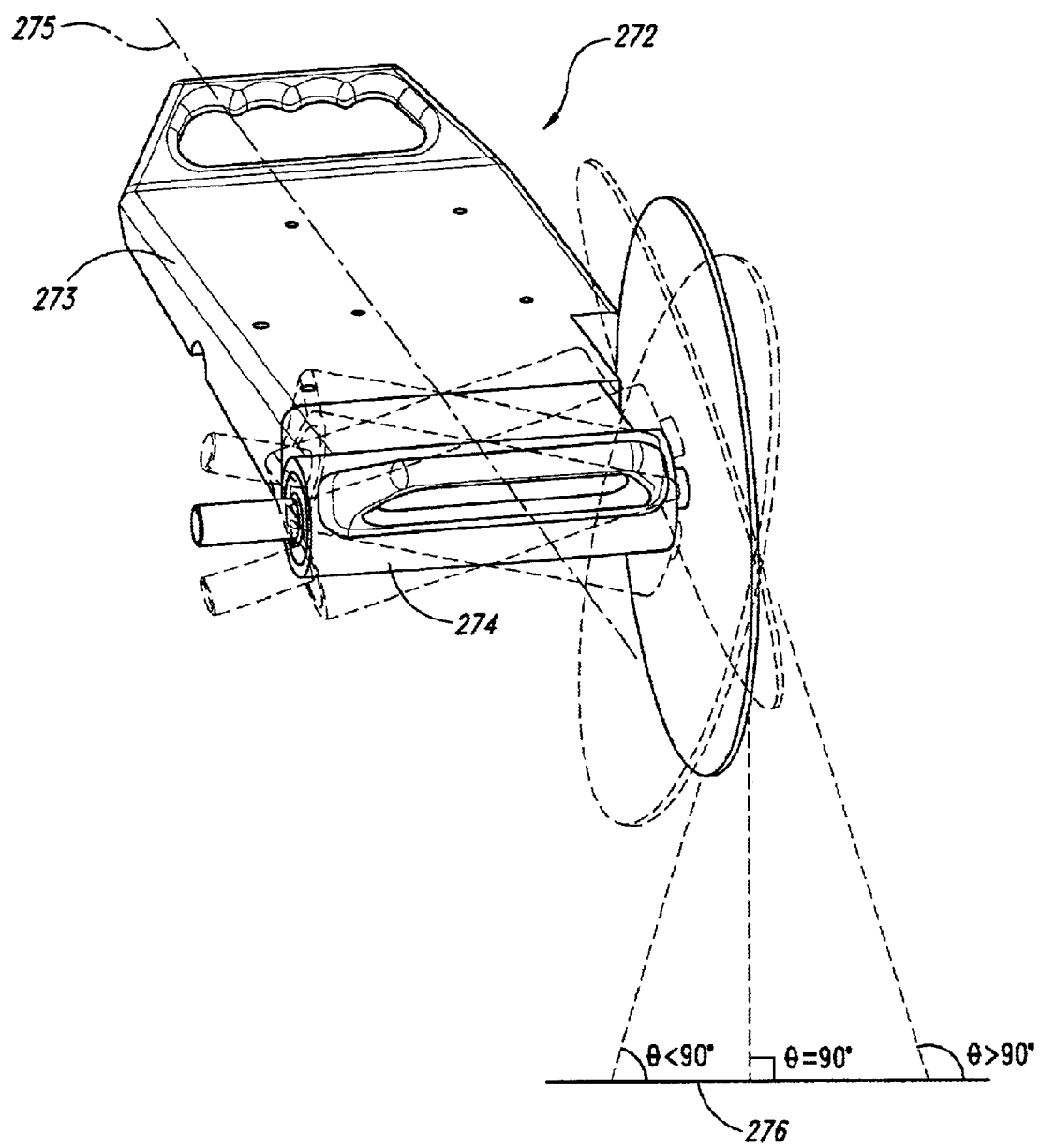
FIG. 13 is a perspective view of the cutting-tool base and saw blade of FIG. 12 and a range of saw-blade positions that the base allows according to an embodiment of the invention.

As shown in FIG. 13, the cutting-tool base 272 allows a craftsperson (not shown) to perpendicularly ($\theta=90°$) align or realign the saw blade 50.

Referring to FIGS. 12 and 13, the cutting-tool base 272 includes a motor mount 273 and a blade mount 274, which pivots with respect to the motor mount 273 about an axis 275 to permit the craftsperson (not shown) to perpendicularly align or realign the blade 50. That is, the blade mount 274 allows the craftsperson to align or realign the blade 50 such that $\theta=90°$ or $\theta\approx90°$ with respect to a surface 276 of the cutting tray 52 (FIG. 2) or of a material to be cut (not shown). Typically, when the tile saw 40 (FIG. 2) is new, the blade 50 is perpendicularly aligned when the blade mount 274 is aligned with the motor mount 273 as shown in FIG. 12. Dropping or banging the saw 40, however, may throw the blade 50 out of perpendicular alignment. For example, dropping the saw 40 may bend the holding bar 192 up or down. To realign the blade 50 if such a mishap occurs, the craftsperson merely rotates the blade mount 274, and thus the blade 50, about the axis 275—the motor mount 273, which is attached to the holding bar 192, is stationary—until the blade 50 is again perpendicularly aligned. The blade mount 274 rotates in both directions to allow realignment whether the unaligned blade 50 is canted to the left ($\theta<90°$) or to the right ($\theta>90°$) of perpendicular alignment ($\theta=90°$). Consequently, the craftsperson can realign the blade 50 without costly repair or replacement of the saw 40 (FIG. 2).

Alternatively, the craftsperson (not shown) can pivot the blade mount 274 about the axis 275 to angle the cut of the blade 50 to the left ($\theta<90°$) or to the right ($\theta>90°$) of the perpendicular ($\theta=90°$). After making the angled cut, the craftsperson can realign the blade 50 with the perpendicular.

Still referring to FIGS. 12 and 13, in one embodiment of the cutting-tool mounting structure 270, the bracket-and-bolt mounting assembly 86 attaches the motor mount 273 to the holding bar 192. Conventional fasteners such as bolts or screws (not shown) mount the motor 48 to the mount 273, and a first drive wheel 278 is conventionally attached to a motor shaft 280. The blade mount 274 includes a blade-shaft receptacle 282 in which a blade shaft 284 is disposed. Conventional bearings (not shown) within the receptacle 282 permit the shaft 284 to rotate. The blade 50 and a collar 286 are conventionally attached to a blade end 288 of the shaft 284, and a drive wheel 290 is conventionally attached to a drive end 292 of the shaft 284. A handle 294 allows the craftsperson (not shown) to carry the saw 40 or the assembly of FIG. 12 when the insert 186 is removed from the receptacle 188 (FIG. 5). Conventional fasteners 296a–296c such as bolts couple the blade mount 274 to the motor mount 273.

The motor 48 drives the blade 50 via a drive member 300 that allows the motor 48 to drive the blade 50 regardless of the pivot position of the blade mount 274 with respect to the motor mount 273. The drive member 300 is typically a conventional drive belt that frictionally engages the drive wheels 278 and 290. Alternatively, the drive member 300 may be a conventional drive chain (not shown) and the wheels 278 and 290 may be replaced by sprockets (not shown) similar to the chain and sprockets found on a bicycle (not shown).

Figure 14:
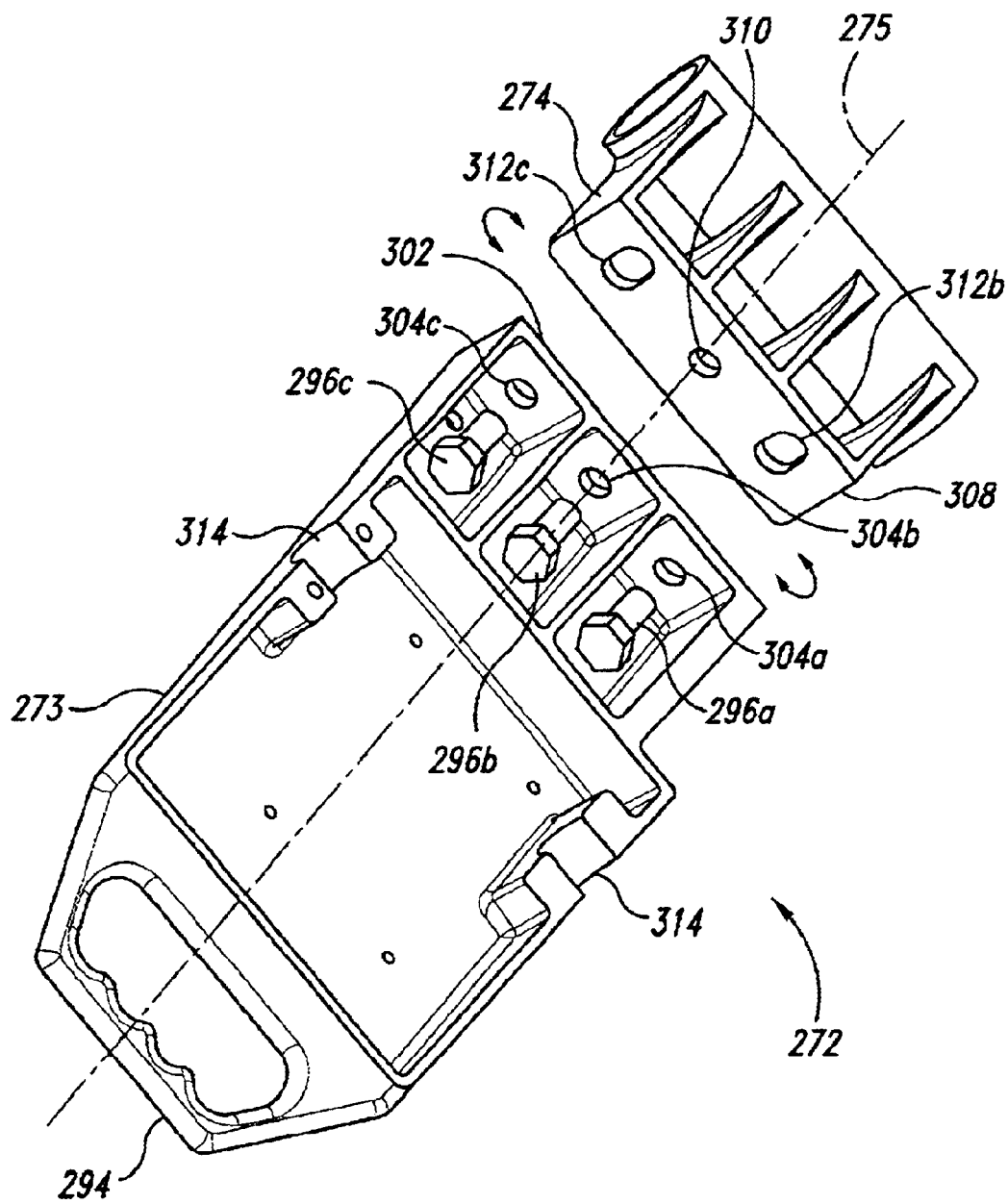
FIG. 14 is an exploded view of the underside of cutting-tool base of FIGS. 12 and 13 according to an embodiment of the invention.

FIG. 14 is an exploded view of the underside of the cutting-tool base 272 of FIGS. 12 and 13 according to an embodiment of the invention. In one embodiment, the motor mount 273 is made from a conventional material such as metal and includes a flange 302 having three holes 304a–304c each sized to receive a respective one of the three attachment members—here bolts—296a–296c. Although shown as circular, as being of uniform size, and as having co-linear centers, the holes 304a–304c may be other shapes such as slot shaped, be nonuniform sizes and shapes, and have unaligned centers.

The blade mount 274 is also made from a conventional material such as metal and includes a flange 308 having one hole 310, which can also be a slot, and two slots 312a and 312b each sized to receive one of the three bolts 296a–296c. Although shown as straight, the slots 312a and 312b may be curved and concentric with the hole 310. Furthermore, although shown as co-linear, the centers of the hole 310 and the slots 312a and 312b need not be co-linear. Moreover, although shown on different sides of the hole 310, the slots 312a and 312b may be on the same side of the hole 310.

Although three holes 304a–304c and three holes/slots 310, 312a, and 312b are shown, the motor and base mounts 273 and 274 may respectively include more or fewer holes and corresponding hole/slots.

Still referring to FIG. 14, the bolts 296a–296c engage respective nuts (not shown) to attach the motor and blade mounts 273 and 274 to each other such that the flange 308 abuts the flange 302 and the hole 310 and slots 312a and 312b align with corresponding holes 304a–304c. When the bolts 296a–296b are loosened, the blade mount 274 can rotate about the axis 275, which extends through the center of the hole 310. However, in other embodiments, the mount 274 may rotate about another axis.

The cutting-tool base 272 also includes a receptacle 314, which together with the mounting assembly 86 (FIG. 12), clamps the base 272 to the holding bar 192.

Referring to FIGS. 12–14, in operation the craftsperson (not shown) can quickly and easily align or realign the blade 50. First, the craftsperson loosens the bolts 296a–296c. Next, the craftsperson rotates the blade mount 274 until the blade 50 is perpendicular ($\theta=90°$) or approximately perpendicular to the surface 276. Then, the craftsperson tightens the bolts 296a–296c to lock the blade into alignment.

From the foregoing it will be appreciated that, although specific embodiments of the invention have been described herein for purposes of illustration, various modifications may be made without deviating from the spirit and scope of the invention.

What is claimed is:

1. A cutting-tool base, comprising:
   a motor mount; and
   a blade mount attachable to the motor mount, operable to receive a cutting blade, and rotatable relative to the motor mount such that the blade is rotatable in two directions from a plumb cutting position about an axis other than an axis that is parallel to a cutting line and tangential to the blade at a point adjacent to the cutting line and on a radius of the cutting blade that is perpendicular to the cutting line when the blade is in a cutting position.

2. The cutting-tool base of claim 1 wherein the blade mount has a center axis and is rotatable about the center axis.

3. The cutting-tool base of claim 1, further comprising:
wherein the blade mount includes a first flange having a first attachment hole;
wherein the motor mount includes a second flange having a second attachment hole; and
an attachment member insertable through the first and second attachment holes.

4. A cutting-tool base, comprising:
a motor mount that includes a first flange having first and second attachment holes;
a blade mount attachable to and rotatable relative to the motor mount and including a second flange having a third attachment hole and a first attachment slot;
a first attachment member insertable through the first and third attachment holes; and
a second attachment member insertable through the first attachment slot and the second attachment hole.

5. A cutting-tool base, comprising:
a motor mount;
a blade mount attachable to and rotatable relative to the motor mount;
wherein the blade mount includes a first flange having a first attachment hole and first and second attachment slots having respective co-linear or approximately co-linear centers;
wherein the motor mount includes a second flange having second, third, and fourth attachment holes having respective co-linear or approximately co-linear centers;
a first attachment member insertable through the first and second attachment holes;
a second attachment member insertable through the first attachment slot and the third attachment hole; and
a third attachment member insertable through the second attachment slot and the fourth attachment hole.

6. A cutting-tool base, comprising:
a motor mount;
a blade mount attachable to and rotatable relative to the motor mount;
wherein the blade mount includes a first flange having a first attachment hole and first and second attachment slots located on opposite sides of the first attachment hole;
wherein the motor mount includes a second flange having second, third, and fourth attachment holes;
a first attachment member insertable through the first and second attachment holes;
a second attachment member insertable through the first attachment slot and the third attachment hole; and
a third attachment member insertable through the second attachment slot and the fourth attachment hole.

7. The cutting-tool base of claim 1 wherein the motor mount is attachable to a holding bar of a saw mounting structure.

8. An apparatus, comprising:
a frame;
a mounting structure attachable to the frame and including,
a motor mount, and
a blade mount having a blade-shaft receptacle, the blade mount being pivotable about an axis perpendicular to the blade-shaft receptacle;
a motor attached to the motor mount;
a blade shaft disposed within the blade-shaft receptacle and coupled to the motor; and
a blade attached to the blade shaft and pivotable with the blade mount in two directions from a plumb cutting position.

9. The apparatus of claim 8, further comprising a material-cutting tray mountable to the frame and movable in a direction parallel to the cutting direction.

10. The apparatus of claim 8, further comprising:
a fastening member that attaches the blade mount to the motor mount; and
wherein the blade mount is pivotable about the fastening member.

11. The apparatus of claim 8 wherein:
the motor comprises a saw motor; and
the blade comprises a saw blade.

12. The apparatus of claim 8, further comprising:
wherein the motor includes a motor shaft and a first drive wheel attached to the motor shaft;
a second drive wheel attached to the blade shaft; and
a drive member attached to the first and second drive wheels.

13. The apparatus of claim 8, further comprising:
wherein the motor includes a motor shaft and a first drive wheel attached to the motor shaft;
wherein the blade shaft has a blade end attached to the blade and has a drive end;
a second drive wheel attached to the drive end of the blade shaft; and
a drive belt attached to the first and second drive wheels.

14. An apparatus, comprising:
a frame;
a material-cutting tray mountable to the frame and having a planar or substantially planar cutting surface; and
a cutting blade mounted to the frame and having a cutting edge, a portion of the cutting edge located where cutting occurs being pivotable through a range of positions that include a first position where the blade is plumb to the cutting surface, a second position where the portion of the cutting edge located where cutting occurs is canted to one side of the first position, and a third position where the portion of the cutting edge located where cutting occurs is canted to the other side of the first position.

15. The apparatus of claim 14 wherein:
the material-cutting tray includes a cutting channel; and
the portion of the cutting edge of the cutting blade located where cutting occurs is aligned with the cutting channel when the cutting blade is in the first position.

16. The apparatus of claim 14 wherein the cutting blade is parallel to a cutting direction.

17. The apparatus of claim 14, further comprising a pivotable blade mount to which the cutting blade is attached.

18. A method for positioning a blade, the method comprising:
rotating a blade mount of a cutting-tool base about an axis that is parallel to a cutting direction of the blade but that is not tangential to the blade at a point that is both normal to the cutting direction and adjacent to a cutting location to adjust a cutting angle of the blade and such that the blade rotates from a first position where the blade is acutely angled to one side of a plumb cutting position to a second position where the blade is acutely angled to another side of the plumb cutting position; and securing the blade mount to a motor mount of the cutting-tool base.

19. The method of claim 18, further comprising releasing the blade mount from the motor mount before rotating the blade mount.

20. The method of claim 18 wherein securing the blade mount comprises tightening at least one bolt that couples the blade mount to the motor mount.

21. A method for positioning a cutting blade of a tile saw, the method comprising:

rotating the blade about an axis that is parallel to a cutting direction from a first position where a portion of the blade located where cutting occurs is canted to one side of a plumb cutting position, through the plumb cutting position, and to a second position where the portion of the blade is canted to another side of the plumb cutting position, and back to substantially the plumb cutting position; and securing the blade in substantially the plumb cutting position.

* * * * *